SOREN K. ANDERSEN,
INVENTOR.

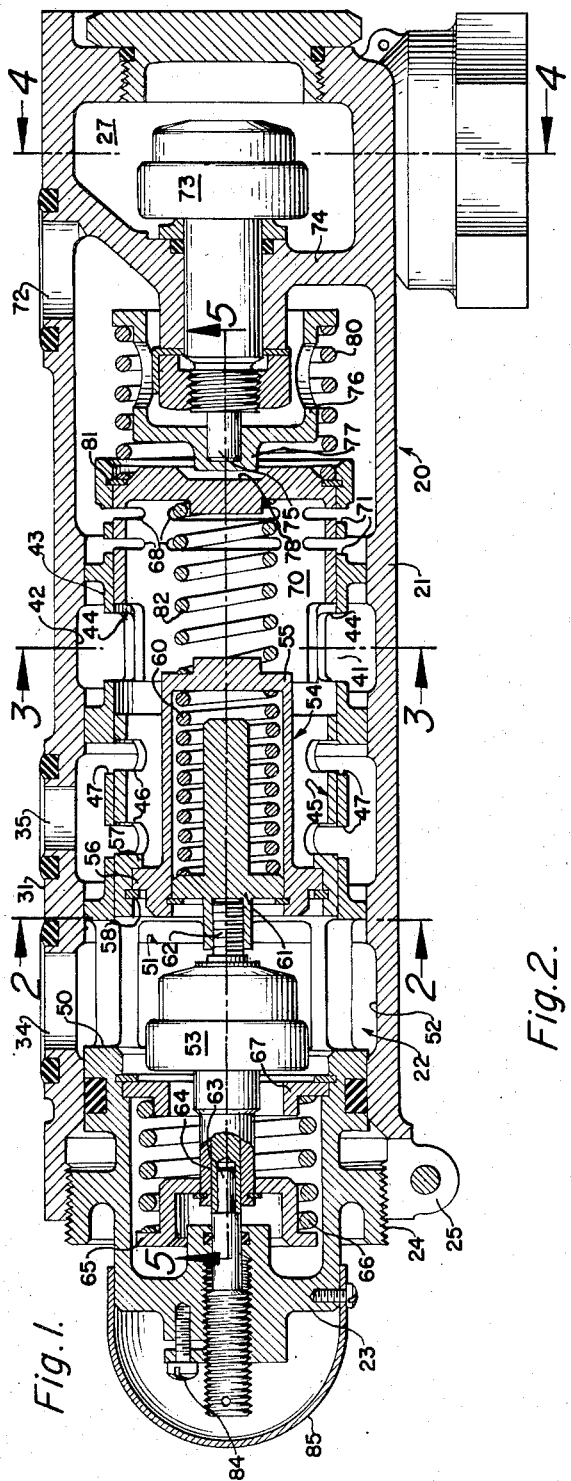
SOREN K. ANDERSEN, INVENTOR.
BY John H. J. Wallace

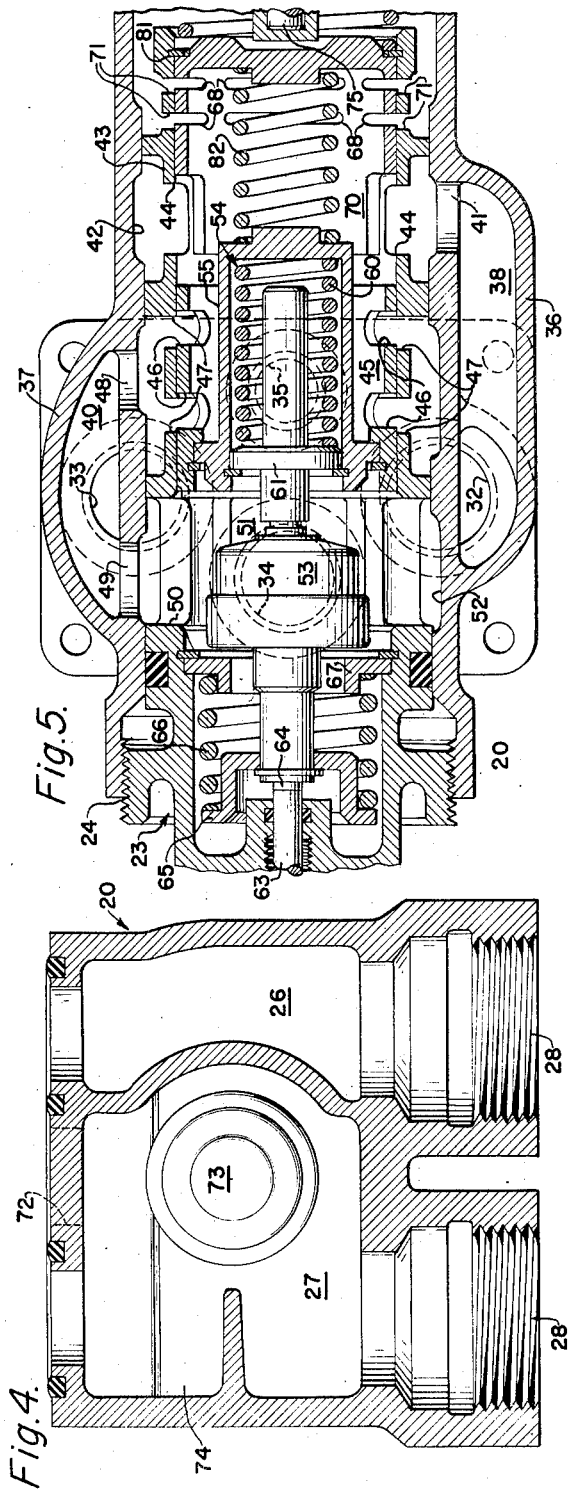

United States Patent Office 2,788,176
Patented Apr. 9, 1957

2,788,176

TEMPERATURE RESPONSIVE FLOW CONTROLLING MECHANISM

Soren K. Andersen, Los Angeles, Calif., assignor to The Garrett Corporation, Los Angeles, Calif., a corporation of California Application March 14, 1956, Serial No. 571,398

13 Claims. (Cl. 236—34.5)

This invention relates generally to fluid flow controlling devices and more particularly to automatically operated valve mechanisms used with heat exchangers to govern the flow of fluid mediums through the various passages thereof.

In the operation of some engines, especially those of the jet type employed in present day aircraft, high operating temperatures are encountered which cause the lubricating oil to heat excessively with consequent deleterious effects. To minimize these effects, it has been proposed to pass the oil through heat exchange relationship with various cooling mediums, such as air or liquids, one of the latter being fuel. It is an object of this invention to provide automatically operated valve means for controlling the flow of oil into heat exchange relationship with fuel in accordance with the temperatures of both the oil and the fuel.

Another object of the invention is to provide an oil flow control mechanism for use with a heat exchanger, the control mechanism having relatively movable valve elements and thermostatic means, responsive to the temperatures of the engine oil and fuel, to move the valve elements to cause the oil to flow through various passages leading to and from the heat exchanger, or to by-pass such exchanger, depending upon the temperature of the oil, the fuel, or both.

Another object is to provide an oil flow controlling mechanism having a casing with a plurality of ports for connection with passages leading to and from an engine and a heat exchanger, the casing receiivng valve means, disposed for movement to control communication between certain sets of ports, and thermostat means, disposed to be engaged by fluid passing through the casing and to actuate the valve means in accordance with changes in temperature of the fluid, the thermostat means serving at certain times to direct part of the oil through the heat exchanger and cause part to by-pass the exchanger, the casing being formed with a mixing chamber in which oil by-passing the heat exchanger and oil flowing therethrough will be intimately mixed before engaging the thermostat means, so that the temperature of the oil will be more accurately controlled.

A further object of the invention is to provide an oil flow controlling mechanism, of the type mentioned in the preceding paragraph, with a second thermostat for engagement by fuel used to cool the oil, the fuel thermostat being so disposed that a predetermined temperature of the fuel will cause such thermostat to move the valve means to a position in which some, or all, of the oil will by-pass the heat exchanger, even though the oil is at a temperature normally causing the valve means to direct the oil through the heat exchanger.

A still further object of the invention is to provide an oil flow controlling mechanism having a casing with ports formed for communication with oil inlet and outlet ports of an engine and a heat exchanger, and a valve means disposed in the casing for movement to establish communication between certain sets of such casing ports, the casing also having thermostat means for moving the valve means in response to changes in temperature of the oil and another medium employed to cool the oil, means being provided, between the oil temperature responsive thermostat and the valve means, which will permit the fuel temperature responsive thermostat to move the valve means under certain conditions irrespective of the temperature of the oil or the condition of the oil temperature responsive thermostat.

Further objects and advantages of the present invention will be apparent from the following description, reference being had to the accompanying drawings wherein the invention has been illustrated in one desirable form.

In the drawings,

Figure 1 is a longitudinal sectional view of a combination fuel and oil temperature responsive flow controlling device formed in accordance with the present invention, this figure showing the flow directing means of the device in one position of operation.

Figures 2, 3 and 4 are vertical transverse sectional views taken on planes indicated respectively by lines 2—2, 3—3 and 4—4 of Fig. 1.

Figure 5 is a longitudinal sectional view taken on the plane indicated by the line 5—5 of Fig. 1.

Figure 8 is a diagrammatic view of the fuel and oil flow paths used in the regulating device.

Figures 6, 7:
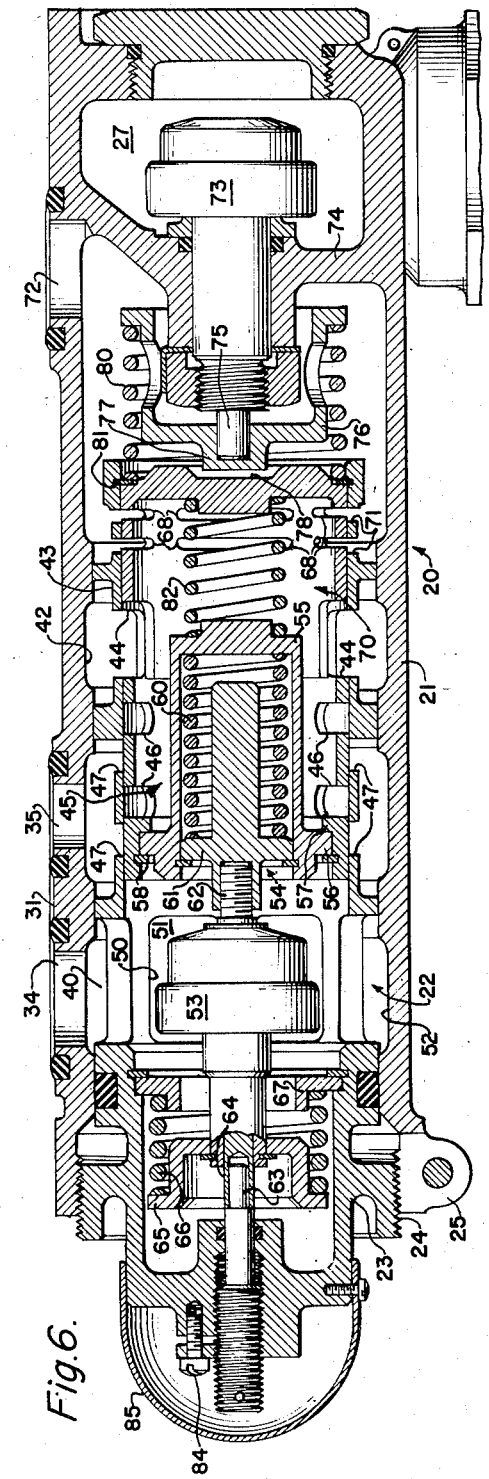
Figures 6 and 7 are also longitudinal sectional views similar to Fig. 1, showing the device with the flow directing means in other positions of operation.

Referring more particularly to the drawing, the numeral 20 designates the oil flow controlling device in its entirety. This device includes a casing body 21 which may be formed in any suitable manner such as by casting, the casing forming a chamber 22 for the reception of a sleeve-like member 23, this member being threaded into one end of the casing as at 24, a clamp-like locking means 25 being employed to retain the body 23 in place.

The casing 21, at the end opposite that receiving the body 23, is formed with a pair of passages 26 and 27 which extend completely through the casing, one end of each passage being threaded as at 28 for connection with fuel ducts, the opposite end of each passage terminating in a port disposed in a wall of the casing formed for engagement with a surface of a heat exchanger 30 of suitable type, shown only diagrammatically in Fig. 8 of the drawings. The casing 21 also has a finished wall 31 in which other openings are formed, this wall being adapted for connection with a subplate, manifold or other device employed to connect the oil flow controlling device with oil passages leading to and from an engine and heat exchanger.

As indicated in Fig. 5, wall 31 has four openings, 32, 33, 34 and 35, formed therein. The opening 35 is employed only as an inspection opening and is used during the fabrication, calibration and servicing of the device. The casing 21 is further formed, as shown in Figs. 2, 3 and 5, with enlargements 36 and 37 which provide passages 38 and 40 for connecting certain openings in the casing. Passage 38 establishes communication between the oil inlet port 32 and an opening 41 which registers with an annular recess 42 formed internally of the casing 21.

The sleeve 23 is provided with an external annular recess 43 in registration with the recess 42, these recesses receiving oil from the engine through inlet port 32 and passage 38. Sleeve 23 is provided with openings 44 which establish communication between recesses 42, 43 and the interior of sleeve 23. Sleeve member 23 is further formed for the slideable reception of a valve element 45 used to control direct communication between the interior of the member 23 and the passage 40. When the valve element 45 is disposed in the position shown in Figs. 1 and 5, ports 46 therein register with ports 47 in sleeve 23 and substantially unobstructed communication is established between the interior of the sleeve 23 and port 48 leading to the passage 40. The latter passage, in the form of the invention illustrated, constitutes a mixing passage or chamber which also communicates with port 33 to receive oil after it has passed through the heat exchanger 30. Chamber 40 has an outlet port 49 which communicates through ports 50 with a thermostat chamber 51 formed in member 23.

Casing 21 is also formed, in registration with port 49, with an internal annular groove 52 which communicates, as shown in Fig. 1, with the port 34 formed in wall 31 and communicating, when the device is connected for operation, with the oil inlet of an engine. With the parts disposed in the positions shown in Figs. 1 and 5, oil from the engine will enter the regulator casing through port 32, flow through passage 38, port 41, grooves 42, 43 and through openings 44 to the interior of member 23, the oil then flowing outwardly through ports 46, 47 and 48 to the mixing chamber 40 from which it will flow through port 49 and groove 52 to the outlet port 34 and back to the engine. When the engine oil is cool, such as during the initial operation thereof, the oil will follow this path. Some of the oil will be admitted to the chambe 51 where it will engage a thermostat 53 supported therein.

Thermostat 53 is provided to transmit movement to the valve element 45 in response to changes in the temperature of the oil. To effect the movement of valve 45 through the operation of thermostat 53, motion transmitting means, indicated generally by the numeral 54, has been provided. This means 54 includes a cup-like adapter 55 having a flange 56 adjacent its open end for engagement with a shoulder 57 formed internally of the member 45. The adapter is held against this shoulder by a snap ring 58 removably received in a groove formed in the valve member. A coil spring 60 is positioned in the member 55 with one end in engagement with the closed end of such member and the other end engaging a shoulder formed on a second adapter 61, this adapter being connected with a projection 62 on one end of the thermostat 53, the latter element being supported at its opposite end by a pin 63 threaded into the end of the member 23. The inner end of the pin 63 is received by a projectable portion 64 of the thermostat, the casing of the thermostat also being engaged with a spring adapter 65. The adapter 65 is received by a projecting portion of the thermostat casing and is restrained against movement in one direction by a snap ring secured on the projection. A coil spring 66 engages the adapter 65, this coil spring also engaging a collar 67 received and held against movement in the sleeve member 23. The force of the spring 66 tends to urge the casing, which is the movable part of the thermostat, in a direction which would dispose the valve 45 in the position shown in Fig. 1 wherein oil entering the device is directed to the mixing chamber.

When the oil temperature increases, an expansible element or substance in the thermostat, which is of a type well known in the art, will cause the casing of the thermostat to move toward the right, as viewed in Fig. 1, which movement will be transmitted by member 61 and spring 60 to the adapter 55 which, in turn, transmits this movement to the valve element 45. A sufficient increase in temperature will move the valve element to the position shown in Fig. 6 in which the ports 46 no longer register with the ports 47 and oil entering the casing through ports 44 cannot be directed to the mixing chamber. At this time such oil will flow through ports 68 formed in a second valve element 70 also received for sliding movement in the sleeve member 23. Under normal conditions the second valve element 70 is disposed in the position shown in Figs. 1, 5 and 6, wherein the ports 68 register with ports 71 formed in the member 23, oil flowing through these ports to the interior of the casing 21 at the right end as shown in such figures. The oil flows from the interior of the right end of casing 21 through a port 72 which communicates with the inlet of an oil passage formed in the heat exchanger 30. Oil thus introduced to the heat exchanger will flow through this member and back to the oil flow controlling device through port 33 which communicates with the mixing chamber 40. As previously pointed out, oil admitted to the mixing chamber may flow through port 34 and back to the engine.

It should be obvious that as the oil temperature increases and the thermostat 53 responds, communication between ports 46 and ports 47 will be gradually decreased so that during this period part of the oil admitted from the engine will be directed through the heat exchanger while other parts will by-pass the heat exchanger and be mixed in the mixing chamber 40, with the oil flowing from the heat exchanger. When such communication is completely interrupted, however, all of the oil admitted from the engine will flow through the heat exchanger. The heat from this oil will be imparted to fuel flowing through the fuel passages in the heat exchanger, thus effecting a cooling of the oil and heating of the fuel.

To prevent excessive heating of the fuel, casing 21 is provided with a second thermostat 73 which is supported by a wall 74 in the casing with the thermostat disposed in the passage 27 to be engaged by fuel flowing from the heat exchanger. Thermostat 73 has an element 75 projecting from one end, this element moving into the portion of the casing occupied by the valve elements when the temperature of the fuel increases. Element 75 engages a spring adapter 76 which is formed with a projection 77 for engagement with a wall 78 provided on the second valve element 70. As long as the temperature of the fuel does not exceed a predetermined degree, the projection 77 will be held in spaced relation from the wall 78 by a coil spring 80 disposed between the adapter 76 and a snap ring 81 positioned in the body 23. It will be noted that the second valve element 70 is separate from and movable independently of the valve element 45. Under normal conditions the valve element 70 is held in the position shown in Figs. 1, 5 and 6 against snap ring 81 by a coil spring 82 disposed between the valve element 70 and the end of spring adapter 55. As the temperature of the fuel increases beyond a desired maximum the element 75 of the thermostat 73 moves outwardly causing the projection 77 to engage and move valve 70 in opposition to the force of springs 80 and 82 until ports 68 no longer communicate with ports 71 in the body 23. As the valve element 70 is moved it will transmit similar motion to the valve element 45 causing ports 46 to again communicate with ports 47. This movement of valve element 45 is possible, even though thermostat 53 is in an expanded condition, due to the flexible connection established between the valve element 45 and the thermostat 53 by the motion transmitting means 54.

When thermostat 73 has moved valve elements 70 and 45 as just described, these elements will occupy the positions shown in Fig. 7 of the drawings. It will be obvious from this figure that at this time oil admitted from the engine will flow into the interior of valve element 45 and outwardly through openings 46 and 47 directly to the mixing chamber 40. This path will be followed even though the oil is at a temperature which would normally cause oil flow through the heat exchanger. It will also be obvious that as soon as the fuel temperature decreases, the element 75 of the thermostat 73 will be retracted and the second valve element 70 will be returned to normal position by the spring 82. In this normal position oil admitted from the engine will again be directed through the heat exchanger. As element 70 is returning to its normal position spring 60 will also return valve 45 to a position dictated by the thermostat 53. This position may be varied through the adjustment of pin 63. After pin 63 is adjusted, it may be locked in position by tightening screw 84; this screw and the adjusting pin 63 are protected by a cover 85 removably secured to the end of body 23.

When the temperature of the oil around thermostat 53 decreases and the heat responsive substance in thermostat 53 contracts, spring 66 will cause the casing of the thermostat 53 and valve 45, together with their associated parts, to return to the initial position shown in Fig. 1. In this position, valve elements 45 and 70 are spaced from one another and, as previously pointed out, ports 46 and 47 are in registration in which condition oil flowing into the casing from the engine may flow directly back to the engine without passing through heat exchange relationship with the fuel.

The flow paths of the oil and fuel during the different stages of operation of the device are shown diagrammatically in Fig. 8. In this figure, the inlet, outlet and heat exchanger ports are shown in the same relative positions as in Fig. 5 and the oil flow paths are indicated by dotted and dashed lines while the fuel flow path is indicated by solid lines. When the engine oil is cool the flow path, as indicated by dotted line, enters inlet port 32, proceeds directly to the mixing chamber 40, then through the thermostat chamber 51 and out through the outlet port 34. After the oil has heated to a predetermined degree, it will follow the path, indicated by dot and dash lines, leading from the inlet port 32 to heat exchanger port 72 from which it will flow through the heat exchanger and back into the regulator through port 33. Oil admitted through this port will flow through the mixing chamber 40 then through the thermostat chamber 51 and out through the outlet port 34. During the time the oil temperature is increasing, some of the oil will flow through the heat exchanger while the rest flows directly to the mixing chamber to be combined therewith before engaging the thermostat. After the oil reaches a predetermined temperature it will all flow through the heat exchanger unless the temperature of the fuel increases excessively in which case, the fuel thermostat will move the oil directing valves to positions to cause the oil to flow directly to the mixing chamber even though it is warm enough to otherwise make it flow through the heat exchanger.

I claim:

1. Oil flow controlling mechanism comprising body means formed for communication with the oil inlet and outlet ports of an engine and a heat exchanger, said body means having a passage for receiving fuel from such heat exchanger; thermostatically actuated means disposed in said body means for controlling communication between said ports, said thermostatically actuated means being exposed to the oil and fuel and operative when the oil temperature is below a predetermined minimum to establish direct communication between the engine oil outlet and inlet ports, said thermostatically actuated means being operative when the oil temperature is between said predetermined minimum and a predetermined maximum to direct a potrion of the oil from said engine through the heat exchanger and mix the same with oil from said engine before contact of the oil with thermostat of actuating said means, said thermostatically actuated means being operative when the oil temperature is above said predetermined maximum to direct all oil from said engine through the heat exchanger, said thermostatically actuated means being operative when the fuel temperature reaches a predetermined maximum to cause oil to by-pass said heat exchanger regardless of the temperature of the oil.

2. Combination fuel and oil temperature responsive flow controlling mechanism comprising body means formed for communication with oil inlet and outlet ports of an engine and one pass of a heat exchanger, said body means having a passage for receiving fuel from another pass of such heat exchanger; flow directing means disposed in said body means for movement to control communication between said ports; thermostatic means in said body means for actuating said flow directing means, said thermostatic means being exposed in part to the oil and in part to the fuel and operative when the oil temperature is below a predetermined minimum to dispose said flow directing means in position to establish direct communication between the engine oil outlet and inlet ports, said thermostatic means being operative when the oil temperature is between such predetermined minimum and a predetermined maximum to direct a portion of the oil from the engine outlet port through the heat exchanger and mix the same with oil direct from the engine outlet port before engagement thereof with the thermostatic means, said thermostatic means also being operative when the oil temperature is above such predetermined maximum to direct all of the oil from the engine outlet port through the heat exchanger, a predetermined maximum fuel temperature causing said thermostatic means to move said flow directing means to a position to cause oil from the engine outlet port to by-pass said heat exchanger regardless of the temperature of the oil.

3. Combination fuel and oil temperature responsive flow controlling mechanism comprising body means formed for communication with the oil inlet and outlet ports of an engine and one pass of a heat exchanger, said body means forming an oil mixing chamber and a passage for receiving fuel from another pass of such heat exchanger; flow directing sleeve means disposed for movement in said body means; resilient means normally tending to move said sleeve means toward a first position in which oil from the engine outlet port flows directly to said mixing chamber and then to the oil inlet port of the engine; a first thermostat disposed in said body means, said first thermostat having an operating connection with said flow directing sleeve means and being responsive to a predetermined increase in oil temperature to move said sleeve means in opposition to said resilient means to a position to direct all oil from the engine outlet port to said heat exchanger and then through said mixing chamber to the inlet port of said engine; and a second thermostat disposed in said fuel-receiving passage, a predetermined increase in fuel temperature causing said second thermostat to move said sleeve means toward said first position regardless of the condition of said first thermostat.

4. Combination fuel and oil temperature responsive flow controlling mechanism comprising body means formed for communication with the oil inlet and outlet ports of an engine and one pass of a heat exchanger, said body means forming an oil mixing chamber and a passage for receiving fuel from another pass of such heat exchanger; flow directing sleeve means disposed for movement in said body means; spring means normally tending to move said sleeve means toward a first position in which oil from the engine outlet port flows directly to said mixing chamber and then to the oil inlet port of the engine; a first thermostat disposed in said body means at the outlet side of said mixing chamber; said first thermostat having an operating connection with said flow directing sleeve means and being responsive to a predetermined increase in oil temperature to move said sleeve means in opposition to said spring means to a position to direct all oil from the engine outlet port to said heat exchanger and then through said mixing chamber to the inlet port of said engine; and a second thermostat disposed in said fuel-receiving passage, increasing fuel temperatures causing said second thermostat to transmit positive force to said sleeve means to move the same toward said first position.

5. Combination fuel and oil temperature responsive flow controlling mechanism comprising body means formed for communication with the oil inlet and outlet ports of an engine and one pass of a heat exchanger, said body means forming an oil mixing chamber and a passage for receiving fuel from another pass of such heat exchanger; flow directing sleeve means disposed for movement in said body means; spring means normally tending to move said sleeve means toward a first position in which oil from the engine outlet port flows directly to said mixing chamber and then to the oil inlet port of the engine; a first thermostat disposed in said body means at the outlet side of said mixing chamber; means establishing a yieldable connection between said first thermostat and said sleeve means, said first thermostat being responsive to a predetermined increase in oil temperature to move said sleeve means in opposition to said spring means to a second position to direct all oil from the engine to the heat exchanger and then through said mixing chamber to the inlet port of said engine; and a second thermostat disposed in said fuel-receiving passage, increasing fuel temperatures causing said second thermostat to move said sleeve means in opposition to said yieldable connection toward said first position.

6. Combination fuel and oil temperature responsive flow controlling mechanism comprising body means formed for communication with the oil inlet and outlet ports of an engine and one pass of a heat exchanger, said body means forming an oil mixing chamber and a passage for receiving fuel from another pass of such heat exchanger; flow directing sleeve means disposed for movement in said body means; spring means normally tending to move said sleeve means toward a first position in which oil from the engine outlet port flows directly to said mixing chamber and then to the oil inlet port of the engine; a first thermostat disposed in said body means at the outlet side of said mixing chamber; means establishing a yieldable connection between said first thermostat and said sleeve means, said first thermostat being responsive to a predetermined increase in oil temperature to move said sleeve means in opposition to said spring means to a second position to direct all oil from the engine to the heat exchanger and then through said mixing chamber to the inlet port of said engine; a second sleeve means disposed for movement in said body means; and a second thermostat disposed in said fuel-receiving passage, said second thermostat being responsive to fuel temperature change to move said second sleeve means toward a position to interrupt flow of oil to said heat exchanger.

7. Combination fuel and oil temperature responsive flow controlling mechanism comprising body means formed for communication with the oil inlet and outlet ports of an engine and one pass of a heat exchanger, said body means forming an oil mixing chamber and a passage for receiving fuel from another pass of such heat exchanger; flow directing sleeve means disposed for movement in said body means; spring means normally tending to move said sleeve means toward a first position in which oil from the engine outlet port flows directly to said mixing chamber and then to the oil inlet port of the engine; a first thermostat disposed in said body means at the outlet side of said mixing chamber; means establishing a yieldable connection between said first thermostat and said sleeve means, said first thermostat being responsive to a predetermined increase in oil temperature to move said sleeve means in opposition to said spring means to a second position to direct all oil from the engine to the heat exchanger and then through said mixing chamber to the inlet port of said engine; a second sleeve means disposed for movement in said body means; and a second thermostat disposed in said fuel receiving passage, said second thermostat being responsive to fuel temperature change to move said first-mentioned and said second sleeve means toward positions to interrupt flow of oil to said heat exchanger and establish flow directly from said engine outlet through said mixing chamber to said engine inlet regardless of the oil temperature.

8. Combination fuel and oil temperature responsive flow controlling mechanism comprising body means formed for communication with the oil inlet and outlet ports of an engine and one pass of a heat exchanger, said body means forming an oil mixing chamber and a passage for receiving fuel from another pass of such heat exchanger; first and second flow directing sleeve sections disposed for movement in said body means; resilient means normally tending to move said sleeve sections toward positions establishing communication between the engine oil outlet port and said heat exchanger and between said engine oil outlet port and said engine oil inlet port via said mixing chamber; a first thermostat disposed in said body means at the outlet side of said mixing chamber, said thermostat being responsive to oil temperature change to move the first of said flow directing sleeve sections to a position to interrupt direct communication between said engine oil outlet port and said mixing chamber; and a second thermostat disposed in said fuel-receiving passage, said second thermostat being responsive to fuel temperature change to move the second of said sleeve sections toward a position to interrupt communication between said engine oil outlet and said heat exchanger, said second thermostat also moving the first sleeve section toward a position to establish direct communication between said engine oil outlet port and inlet port through said mixing chamber regardless of the oil temperature.

9. Oil temperature responsive flow controlling mechanism comprising casing means having first and second ports for receiving oil from and returning oil to an engine, third and fourth ports for conducting oil to and receiving oil from a heat exchanger, and a passage for fuel discharged from said heat exchanger, said casing means forming serially connecting mixing and thermostat chambers between the second and fourth ports; thermostatic means disposed in said thermostat chamber; flow directing means disposed in said casing for movement by said thermostatic means between a first position establishing communication between said first port and said mixing chamber and a second position interrupting such communication and establishing communication between said first and third ports; and a second thermostatic means in said fuel passage, said flow directing means being responsive to the operation of said second thermostatic means to move said flow directing means toward said first position irrespective of the stage of operation of said first-mentioned thermostatic means.

10. Oil temperature responsive flow controlling mechanism comprising casing means having first and second ports for receiving oil from and returning oil to an engine, third and fourth ports for admitting oil to and receiving oil from a heat exchanger, and a passage for fuel discharged from said heat exchanger, said casing means forming mixing and thermostat chambers connected in series between said fourth and said second ports; a first thermostatic means disposed in said thermostat chamber; flow directing means disposed for movement in said casing means between a first position establishing communication between said first port and said mixing chamber and a second position interrupting such communication and establishing communication between said first and third ports; means establishing a yieldable connection between said first thermostatic means and said flow directing means; and a second thermostatic means disposed in said fuel passage, predetermined operation of said thermostatic means being directly transmitted to said flow-directing means to move the same toward said first position in opposition to the action of said first thermostatic means.

11. Temperature responsive fluid flow controlling mechanism comprising casing means having first and second ports for receiving a first fluid from and returning such fluid to a utilizing device, third and fourth ports for directing such first fluid to and receiving it from a heat exchanger, and a passage for a second fluid discharged from said heat exchanger, said casing means forming serially connected mixing and thermostat chambers between the second and fourth ports; thermostatic means disposed in said thermostat chamber; flow directing means disposed in said casing for movement by said thermostatic means between a first position establishing communication between said first port and said mixing chamber and a second position interrupting such communication and establishing communication between said first and third ports; and a second thermostatic means in the passage for said second fluid, said flow directing means being responsive to a predetermined operation of said second thermostatic means to move said flow directing means toward said first position irrespective of the stage of operation of said first-mentioned thermostatic means.

12. Temperature responsive fluid flow controlling mechanism comprising casing means having first and second ports for receiving a first fluid from and returning such fluid to a utilizing device, third and fourth ports for directing such first fluid to and receiving it from a heat exchanger, said casing means forming serially connected mixing and thermostat chambers between the second and fourth ports; thermostatic means disposed in said thermostat chamber; flow directing means disposed in said casing for movement by said thermostatic means between a first position establishing communication between said first port and said mixing chamber and a second position interrupting such communication and establishing communication between said first and third ports; and a second thermostatic means operatively connected with said flow directing means and responsive to predetermined changes in temperature of a second fluid to move said flow directing means toward said first position irrespective of the stage of operation of said first-mentioned thermostatic means.

13. Oil temperature responsive flow controlling mechanism comprising casing means having first and second ports for receiving oil from and returning oil to an engine, third and fourth ports for conducting oil to and receiving oil from a heat exchanger, said casing means forming serially connected mixing and thermostat chambers between the second and fourth ports; thermostatic means disposed in said thermostat chamber; flow directing means disposed in said casing and connected for movement by said thermostatic means between a first position establishing communication between said first port and said mixing chamber and a second position interrupting such communication and establishing communication between said first and third ports; and means for moving said flow directing means toward said first position irrespective of the stage of operation of said thermostatic means.

References Cited in the file of this patent

UNITED STATES PATENTS

| | | |
|---|---|---|
| 1,290,638 | Morgan | Jan. 7, 1919 |
| 2,396,053 | McEntire | Mar. 5, 1946 |
| 2,680,433 | Padova et al. | June 8, 1954 |
| 2,698,717 | Cisco | Jan. 4, 1955 |

FOREIGN PATENTS

| | | |
|---|---|---|
| 730,960 | Germany | Jan. 29, 1943 |